United States Patent [19]

Sinha et al.

[11] 4,072,479
[45] Feb. 7, 1978

[54] IMPREGNATED ACTIVATED CARBON FOR IMPROVED REMOVAL OF MALODOROUS COMPOUNDS

[75] Inventors: Rabindra Kumar Sinha, Oakdale; Norman J. Wagner; Ronald S. Joyce, both of Pittsburgh, all of Pa.

[73] Assignee: Calgon Corporation, Pittsburgh, Pa.

[21] Appl. No.: 752,498

[22] Filed: Dec. 20, 1976

Related U.S. Application Data

[63] Continuation of Ser. No. 662,783, March 1, 1976, abandoned, which is a continuation-in-part of Ser. No. 570,542, April 22, 1975, abandoned.

[51] Int. Cl.$^2$ ............................................. B01D 53/04
[52] U.S. Cl. .......................................... 55/73; 55/74; 55/387
[58] Field of Search ............. 55/73, 74, 387, DIG. 30; 252/411 R, 411 S, 420; 423/224, 230

[56] References Cited

U.S. PATENT DOCUMENTS

| | | | |
|---|---|---|---|
| 3,391,988 | 7/1968 | Friess | 55/73 X |
| 3,416,293 | 12/1968 | Alexander | 55/73 |
| 3,578,390 | 5/1971 | Kruel et al. | 55/73 X |
| 3,598,521 | 8/1971 | Alley | 55/73 X |
| 3,696,629 | 10/1972 | Heston, Jr. | 55/73 X |
| 3,736,726 | 6/1973 | Grimm et al. | 55/73 |

*Primary Examiner*—Thomas G. Wyse
*Assistant Examiner*—Robert H. Spitzer
*Attorney, Agent, or Firm*—Edmunde D. Riedl; Raymond M. Speer

[57] ABSTRACT

An improved process for the removal of malodorous compounds, especially sulfur-containing compounds, for example $H_2S$ and methyl mercaptan, from gas streams containing oxygen in which a bed of activated carbon treated with NaOH and moisture is used to remove said compounds. The treatment, which may also be combined with regeneration of the activated carbon, is effected, typically, by applying to the carbon one bed volume of dilute (4–6%) NaOH solution, draining and drying with 50–100% R.H. air.

5 Claims, No Drawings

IMPREGNATED ACTIVATED CARBON FOR IMPROVED REMOVAL OF MALODOROUS COMPOUNDS

This is a continuation of application Ser. No. 662,783, filed Mar. 1, 1976, now abandoned, which was in turn a continuation-in-part of application Ser. No. 570,542, filed Apr. 22, 1975, and now abandoned.

BACKGROUND OF THE INVENTION

The present invention is concerned with an improved method and product for the removal of compounds, especially sulfur-containing compounds having disagreeable odors, from gas streams containing oxygen, most often, air. The improvement comprises use of a suitable activated carbon impregnated with NaOH and moisture.

The malodorous compounds whose removal is enhanced by use of the method and product of the present invention comprise those malodorant compositions detectable by use of dynamic olfactometer devices and procedures, for example those described in *Operating and Reference Manual: Dynamic Olfactometer Model 1000*, Chicago Scientific Inc., Bensenville, Ill. (1974), or equivalent devices and procedures. A more detailed discussion of the use of such a dynamic olfactometer is set forth hereinafter. The malodorous sulfur-containing compounds whose removal is enhanced by use of the method and product of the present invention include, principally, hydrogen sulfide, mercaptans, and sulfides.

Malodorous compounds, especially sulfur-containing compounds, occur in a number of environments, where they are primarily responsible for the presence of disagreeable odors. Such environments include petroleum storage areas, sewage treatment facilities, and pulp and paper production sites, among others. These odor-causing compounds may be bacterial breakdown products of higher organic compounds.

Hydrogen sulfide, $H_2S$, is a colorless, denser than air, gas with a characteristic odor of rotten eggs. The gas is produced in coal pits, gas wells, sulfur springs, and from decaying organic matter containing sulfur. Control of emissions of this gas, particularly from municipal sewage treatment plants, has long been considered desirable. In fact, in addition to its unpleasant odor, hydrogen sulfide is not only flammable, but with respect to its human toxicity, it is regarded as an extremely hazardous substance. Consequently, ways of controlling hydrogen sulfide emissions have long been sought in a number of areas, including, among others, crude oil storage, petrochemical refining, and papermaking.

Mercaptans, also referred to as thio alcohols or thiols, may be represented by the formula R-S-H, where R represents an alkyl group of from one to eight carbon atoms. The obnoxious odor of mercaptans decreases with increasing molecular weight, and is not present where R is alkyl of nine or more carbon atoms. While only methyl and ethyl mercaptan of the said mercaptans are in the form of a gas at normally encountered ambient temperatures, the mercaptans are volatile and even extremely small concentrations are detectable by humans. Consequently, mercaptans of up to eight carbon atoms are included within the scope of the present invention. In addition to methyl and ethyl mercaptan, such mercaptans are, for example, n-propyl mercaptan and n-butyl mercaptan.

Organic sulfides may be represented by the formula R—S—R', where R and R' may be the same or different and are alkyl of from one to five carbon atoms, provided that the total number of carbon atoms for R and R' does not exceed eight.

Activated carbon will physically adsorb considerable quantities of hydrogen sulfide. See, for example, U.S. Pat. No. 2,967,587. See also French Pat. No. 1,443,080, which describes adsorption of hydrogen sulfide directly by activated carbon, which is then regenerated by hot inert gas or superheated steam. However, it has long been recognized that much better removal can be accomplished by employing the carbon to, in effect, catalyze the oxidation of hydrogen sulfide to sulfur, based on the ability of carbon to oxidize hydrogen sulfide to elemental sulfur in the presence of oxygen. For example, a conventional process employs small amounts of ammonia added to the influent gas stream containing hydrogen sulfide and oxygen to further catalyze the reaction, and capacities as high as 100 percent by weight of the carbon have been reported.

Other catalytic agents to be impregnated on activated carbon for the removal of hydrogen sulfide have been suggested. See, for example, French Pat. No. 1,388,453 which describes activated carbon granules impregnated with 1% iodine ($I_2$) for this use. South African Pat. No. 70/4611 discloses the use of silicate-impregnated activated carbon. Swinarski et al., *Chem. Stosowana*, Ser. A 9(3), 287-94 (1965), (*Chemical Abstracts*, Vol. 64, 1379c), describe the use of activated carbon treated with potassium salts, including KOH, for hydrogen sulfide adsorption.

A problem faced in the prior art in using activated carbon for hydrogen sulfide removal has been the reduction in net adsorption capacity of the activated carbon with increasing number of adsorption cycles. That is, the activated carbon experiences an increase in the amount of residual compositions, possibly sulfur, which, in turn, results in a continuing reduction in the total adsorption capacity of the activated carbon through successive adsorption cycles. South African Pat. No. 70/4611, referred to above, teaches overcoming this problem with the use of silicate-impregnated activated carbon, but also teaches that extraction with alkaline solutions is ineffective to remove such residual adsorbate. Boki, in *Shikoku Igaku Zasshi*, 30 (3), 121-8 (1974) (*Chemical Abstracts*, Vol. 81, 126300p), discloses that the adsorption capacity of activated carbons used for adsorption removal of hydrogen sulfide gas can be recovered to nearly original levels by treatment with 1% NaOH. However, it is clear that these are simply attempts in the prior art to overcome the problem of decreasing net adsorption. Thus, the prior art has failed to appreciate the discovery of the present invention, that proper treatment of activated carbon with NaOH and moisture can result in an activated carbon whose capacity for malodorant compound, especially hydrogen sulfide and malodorous sulfur-containing compound removal, is increased several fold, not merely restored to unused (virgin) activated carbon capacity. In accordance with the present invention, the character of the adsorption by the activated carbon is apparently changed from predominantly physical adsorption to predominantly chemical reaction followed by physical adsorption.

The overall reaction in which hydrogen sulfide is oxidized to elemental sulfur in the presence of activated carbon may be represented by the following equation:

$$2H_2S + O_2 \rightarrow 2H_2O + 2S \quad (1)$$

However, it has been demonstrated that two other reactions can occur:

$$2H_2S + 3O_2 \rightarrow 2SO_2 + 2H_2O \quad (2)$$

and $$2SO_2 + 4H_2S \rightarrow 6S + 4H_2O \quad (3)$$

It has been demonstrated that the reaction (2) above is accelerated by the presence of moisture on the activated carbon. See Swinarski, A., and Siedlewski, *J. Roczniki Chemii*, 35, pp. 999–1008 (1961). It is also known that preoxidation of the carbon surface increases total hydrogen sulfide removal capacity, but at the same time also increases the proportion of sulfur oxides formed. Thus, during hydrogen sulfide removal by activated carbon, a number of potential reaction products are possible, although the primary reaction product is elemental sulfur.

The present invention is also concerned with the use of NaOH to regenerate activated carbon which has become loaded with, i.e., reached its efficient removal capacity for, malodorant compositions, especially hydrogen sulfide and other malodorous sulfur-containing compounds. The regeneration with NaOH restores the major part of the original adsorptive capacity of the spent activated carbon. However, the present invention employs such regeneration as a convenient method of removing adsorbate while at the same time providing a ready means of impregnation of the activated carbon with NaOH for improved adsorptive capacity for malodorous compounds, as described hereinafter. Thus, other regeneration techniques, known in the art, might be employed, followed by NaOH impregnation. Such conventional regeneration techniques, useful in restoring virgin capacity prior to impregnation with NaOH and moisture, include thermal treatment and wet air oxidation, among others.

It is well known that activated carbons used for removal of hydrogen sulfide can be regenerated for re-use by removing the adsorbed sulfur compounds, a large portion of which will be elemental sulfur when oxidizing conditions exist during the adsorption. The compounds can be removed by extracting them with a suitable organic solvent. Such materials as ammonium sulfide, carbon disulfide, xylene and toluene have proven effective regenerating media. Regeneration using ammonium sulfide as the solvent has been common. Sulfur is recovered from the solvent by distilling off the ammonium polysulfide or by steaming the solvent. Regeneration has also been accomplished using hot inert gas, superheated steam and natural gas under high pressure.

Regeneration methods heretofore employed in the art for restoring activated carbons used to removed hydrogen sulfide suffer from a number of disadvantages. The use of organic solvents is undesirable from the standpoint of environmental pollution as well as of personnel safety, and will usually entail expensive recovery systems. Regeneration by hot gases or steam requires the expenditure of considerable amounts of energy, a clear disadvantage. A more serious detriment, perhaps, than those just discussed, is that detriment inherent in most prior art activated carbons used for hydrogen sulfide removal and processes for their regeneration, which is the decrease in net adsorption capacity experienced through successive adsorption cycles. The disadvantages of these prior art activated carbons and regeneration processes has been overcome in the treatment method and resultant activated carbon of the present invention.

SUMMARY OF THE INVENTION

In accordance with the present invention, activated carbon is treated with moisture and NaOH, and the thus-treated activated carbon is then employed for enhanced removal of malodorant compositions, especially malodorous sulfur-containing compounds from gas streams, under oxidizing conditions. Once the activated carbon has become loaded as a result of adsorption of the said compounds, it is then regenerated by treatment with NaOH and moisture under conditions resulting in impregnation sufficient to restore the activated carbon to more than its original adsorptive capacity for the said compounds, in fact, sufficient to impart an enhanced adsorptive capacity for the said compounds, over the adsorptive capacity of virgin, i.e., unimpregnated activated carbon.

The treatment method and the "regeneration" method of the present invention may thus be regarded as essentially the same, the basic distinction being that the treatment method is performed upon virgin activated carbon, while the regeneration method is performed upon loaded activated carbon under conditions resulting in impregnation of the activated carbon with moisture and NaOH, as hereinafter described. It will be understood that the present invention includes malodorant composition, especially malodorous sulfur-containing compound, removal methods where virgin activated carbon is employed initially and the loaded activated carbon resulting from removal of the said compounds is regenerated and subsequently subjected to the treatment method of the present invention. However, it is preferred to employ initially an activated carbon which has been subjected to the treatment with NaOH and moisture, since the adsorption capacity of the activated carbon for malodorous compounds is thereby greatly increased.

The treated activated carbons of the present invention are employed to remove malodorant compositions, especially malodorous sulfur compounds, by adsorption from ambient gas streams under oxidizing conditions. The concentration of said malodorous compounds in the gas stream is not considered critical, and concentrations resulting in as low an amount as $1.0 \times 10^{-6}$ mole of the compounds passing through the activated carbon per minute can be removed by adsorption. The general effectiveness of the treated activated carbons of the present invention in removing, in particular, $H_2S$ by adsorption has been measured in an approximate manner by establishing the time required to arrive at a breakthrough concentration of 50 parts per million by volume of $H_2S$ in the gas passing out of the activated carbon. Such a concentration of $H_2S$ in the outlet gas after adsorption treatment has been considered, for convenience, as indicative of nearly complete loading of the activated carbon. For methyl mercaptan, loading capacity as percent by weight of adsorbate based on weight of activated carbon, for various breakthrough levels, has been determined to establish the effectiveness of the treated activated carbons of the present invention. Enhanced removal capacity is shown by comparative determinations using virgin activated carbon.

The effectiveness of removal of malodorant compositions generally, using the treated activated carbons of the present invention, has been measured by means of a dynamic olfactometer. Such a device, and the procedures associated therewith are available from Chicago Scientific Inc. Other equivalent devices may be employed. Basically, a dynamic olfactometer employs the human olfactory system in the form of an odor panel to perform a subjective evaluation of the odorant level. This subjective evaluation may then on the basis of statistical considerations, be used to establish an objective quantification of the odorant level. The resultant determinations serve as a basis for the detection of odors, and thus, for ascertaining removal efficiencies. The test facilities include an odor evaluation room provided with odor-free air. The dynamic olfactometer device provides a stream of deodorized air at a known flow rate to an observer, with an odorant of known concentration being slowly added in ever-increasing concentrations until detected by the observer. This is the sensory perception (odor) threshold for that observer. An odor panel is then selected by screening procedures which include testing with known odorants. A sample of air to be examined for malodorant compositions is then introduced in the same manner as with the known (standard) odorant until odor perception again occurs. In addition, evaluation of the air stream containing malodorant compositions, which are of unknown make-up, is normalized by comparison with a known odorant used as standard. Results are expressed in odor units (O.U.), which represent the ratio of the volume of total air flow to the volume of malodorant (or odorant) composition air flow in the dynamic olfactometer.

The physical and chemical makeup of the gas stream from which it is desired to remove malodorant compositions, especially $H_2S$ and other malodorous sulfur compounds, is not critical, provided that oxidizing conditions prevail. Typically, the malodorous compounds will be removed from air, especially from air admixed with effluent gas streams resulting from municipal waste treatment facilities, petrochemical refining plants, and so forth. The oxidizing conditions required are generally that oxygen at least be present in the gas stream being treated. This may be in very small amounts, but usually will be in an amount of at least 5 percent by volume, preferably 10 percent by volume, and most preferably at least 15 percent by volume. The required oxygen content is derived most readily from air, if air comprises a sufficient portion of the gas stream being treated to provide the necessary amount of oxygen. The oxygen may, of course, be independently introduced into the gas stream being treated, if oxygen is totally absent therefrom or present only in insufficient amounts. As will be appreciated, the amount of oxygen required for maximum malodorous compound adsorption in accordance with the present invention will depend on a number of factors, including the concentration and absolute amount of any one or more of the malodorous compounds, especially sulfur compounds, being adsorbed from the gas stream being treated.

As is recognized, the amount of malodorant composition, especially hydrogen sulfide or other malodorous sulfur compound, adsorbed by any particular activated carbon will be a function of at least the following factors: basic degree of attraction of the activated carbon for the particular malodorous compound; the pore structure of the activated carbon, particularly with respect to size; the specific surface area of the activated carbon; and the surface characteristics of the activated carbon. Selection of a suitable activated carbon starting material for use in the treatment method of the present invention will largely be within the ordinary skill of the artisan. For example, it will be preferred to employ an activated carbon whose pores have diameters falling, for the most part, in the range of from about 10 to about 80 A. It has been found particularly important to employ activated carbons having high surface areas. Thus it is preferred to use BPL granular activated carbon for vapor phase applications, manufactured by the Pittsburgh Activated Carbon Company, Pittsburgh, Pennsylvania. Granular activated carbon is preferred to powder, and the size range of the granules is largely a matter of choice, although granules falling between Nos. 4 and 10 of the U.S. Sieve Series are preferred. It has also been found that flow rates of the gas stream being treated through the bed of activated carbon especially affect the breakthrough capacities of the activated carbon, as will be shown in more detail hereinafter.

The NaOH treatment of the activated carbon starting material may be carried out in any manner which effectively impregnates the activated carbon with from about 0.5 percent to about 20 percent by weight of NaOH, based on weight of dry activated carbon. The preferred amount of NaOH impregnated is from about 1.0 to about 15 percent by weight, while the most preferred amount of NaOH impregnated is from about 5 to about 10 percent by weight of the activated carbon. The NaOH treatment may be carried out simply by soaking the virgin or loaded activated carbon in one bed volume of NaOH solution of from about 5 to about 60% by weight concentration. The time required to produce the required impregnation levels as described above is dependent approximately on the concentration of the NaOH solution employed, and will only be as much time as is needed for the NaOH solution to penetrate the activated carbon. For example, it has been found that the BPL activated carbon is effectively impregnated in accordance with the present invention when it is soaked in one bed volume of 4.8 percent by weight NaOH for only a few minutes. It will be understood that using NaOH for regeneration alone, as opposed to impregnation, requires substantially longer periods of time, as described hereinafter. These times will also tend to be dependent upon the concentration of the NaOH solution employed. Other methods of impregnating the activated carbon starting material would suggest themselves as equally appropriate, and these are included within the scope of the present invention. For example, the NaOH solution may be passed through the activated carbon rather than being used in a static immersion treatment. However, it has been found that a preferred method of NaOH impregnation is by spray-addition in which a NaOH solution is sprayed onto the granular activated carbon being tumbled in a mixer. This method of impregnation will be described in more particular detail hereinafter.

While the NaOH regeneration of the loaded activated carbon restores the activated carbon essentially to its adsorption capacity as virgin activated carbon, it has been discovered that the presence of moisture in the activated carbon, in association with the impregnated NaOH, results in an activated carbon whose adsorption capacity for malodorant compositions, especially $H_2S$ and other sulfur compounds, is increased as much as ten fold over the adsorption capacity of virgin activated carbon for said malodorous compounds. While the presence of moisture in virgin activated carbon effects a substantial increase in the total malodorous compound adsorption capacity of the activated carbon, as compared to dry, that is, moisture-free virgin activated carbon, the overall effect produced by combining NaOH and moisture in treatment of activated carbon, is a synergistic one, as will be demonstrated hereinafter.

The term "moisture" is intended to define essentially pure water, and with reference to treatment of activated carbon and its presence therein, it is intended to define water present within the activated carbon structure, being held therein mechanically or by physical or chemical adsorption, or by any combination of these.

The amount of moisture present in the activated carbon which will be sufficient to produce the maximum increase in malodorous compound especially sulfur compound, adsorption capacity of the activated carbon, in accordance with the present invention, whether the activated carbon is a virgin carbon being treated initially, or a loaded carbon being regenerated and impregnated, will depend on several factors, related primarily to the characteristics of the activated carbon being treated or regenerated. Moreover, the presence of moisture in the NaOH-impregnated activated carbon appears to further increase the malodorant composition, especially $H_2S$ and other sulfur compound, adsorption capacity of the activated carbon in even small amounts of a few percent or less, by weight. Generally, the amount of moisture desirably present in the NaOH-impregnated carbon is from about 4 to about 50 percent by weight of the activated carbon, preferably from about 6 to about 45 percent, and most preferably from about 10 to about 40 percent by weight.

The desired moisture content of the activated carbon in accordance with this invention, is readily obtained by employing moist air during the drying step following NaOH impregnation. Drying with air having a relative humidity of from 50 to somewhat less than 100 percent has been found sufficient to introduce the desired amount of moisture. However, moisture should not be introduced to the extent that the carbon is soaked to the point of wetness thereby. Other methods of introducing the desired amount of moisture will readily suggest themselves to one of ordinary skill in this art, and all such methods are intended to be included within the scope of this invention.

The NaOH and moisture impregnated activated carbons of the present invention possess advantages over ordinary activated carbons in addition to enhanced adsorptive capacity for malodorant compositions. For example, the NaOH impregnated activated carbon has a demonstrated slimicidal property which can prevent the accumulation of slime on the activated carbon, thus preventing interference by the slime with its functioning through blocking of the activated carbon pores. And the NaOH and moisture impregnated activated carbons of the present invention do not require water scrubbing prior to use in odor control applications, which is the case for ordinary activated carbons preparatory to such use.

The NaOH and moisture impregnated activated carbons of the present invention may, of course, be employed alone in beds for the removal of malodorant compositions, including $H_2S$ and other malodorous sulfur compounds. However, they may be advantageously employed together with beds containing other activated carbons, including ordinary virgin activated carbon, as well as activated carbons impregnated with various catalytic materials. Various combinations of bed arrangements may be employed. Thus, for example, a bed or ordinary virgin activated carbon may be employed together with a bed of the NaOH and moisture impregnated activated carbon of the present invention, either upstream (i.e., before the bed of NaOH and moisture impregnated activated carbon with respect to the effluent gas being treated) or downstream thereof.

The following examples will serve to better illustrate the treatment and regeneration methods of the present invention and the dramatic increase in malodorant composition, especially $H_2S$ and other sulfur compound, adsorption capacity produced thereby.

EXAMPLE 1

A 15 ml, 6.55 g. sample of dry, virgin 4 × 10 BPL activated carbon was exposed to moisture and then used to remove $H_2S$ from a gas stream. The $H_2S$ mass flow was $2.26 \times 10^{-4}$ moles/min. The $H_2S$ concentration of the outflow gas was monitored and the time elapsed after commencement of the sample run at which the $H_2S$ concentration level reached 50 parts per million by volume of the outflow gas was recorded. Once this level was reached, the activated carbon was considered loaded and regeneration with subsequent impregnation was carried out. The original activated carbon sample was run through a total of 10 cycles of loading, regeneration and impregnation, during which the regeneration/impregnation procedures were varied. The NaOH was used throughout at a concentration of 33.3% by weight. It was found that the repeated regeneration procedures produced a constant "heel", or residual adsorbate, of 2.5–2.75% sulfur in the activated carbon. The details of the various regeneration procedures employed, as well as of the results thereof, are set out in the following table of data.

TABLE I

| Cycle No. | Carbon Pretreatment | Weight Pickup of Carbon After Pretreatment | Breakthrough Time to 50 ppm | % Loading of $H_2S$ |
|---|---|---|---|---|
| 1 | Virgin carbon exposed to moisture | 0.4 g. of $H_2O$ | 86 min. | 9.5 wt-% |
| 2 | 22.5-Hr. caustic wash with 7 bv* of 33.3 wt-% NaOH followed by water wash to reduce pH followed by air-drying for one hour (10 l/min) | 0.35 g. of $H_2O$ & residual S | 202 min. | 22.4 wt-% |
| 3 | 15-Hr. soak in one bv of 33.3 wt-% NaOH followed by water wash to reduce pH followed by air-drying for 2 hrs. (10 l/min) | <0.25 g. of $H_2O$ & residual S | 110 min. | 12.2 wt-% |

TABLE I-continued

H₂S ADSORPTION AND CAUSTIC REGENERATON ON 4 × 10 BPL CARBON

| Cycle No. | Carbon Pretreatment | Weight Pickup of Carbon After Pretreatment | Breakthrough Time to 50 ppm | % Loading of H₂S |
|---|---|---|---|---|
| 4 | Same procedure as cycle 3 | <0.25 g. of H₂O & residual S | 120 min. | 13.3 wt-% |
| 5 | Same procedure as cycle 3 | <0.25 g. of H₂O & residual S | 111 min. | 12.3 wt-% |
| 6 | Same procedure as cycle 3 with longer air-drying (3 hrs. at 10 l/min.) | <0.15 g. of H₂O & residual S | 20 min. | 2.2 wt-% |
| 7 | Some procedure as cycle 3 followed by exposure to air (100% RH at 25° C.) for 2 hrs. (10 l/min). | 2.30 g. of H₂O & residual S | 195 min. | 21.6 wt-% |
| 8 | 62-Hr. exposure to one bv of 33.3 wt-% NaOH followed by water wash to reduce pH followed by N₂ drying followed by exposure to N₂ (100% RH at 25° C.) for 2 hrs. (10 l/min) | 2.15 g. of H₂O & residual S | 120 min. | 13.3 wt-% |
| 9 | 15-Hr. exposure to one bv of 33.3 wt-% NaOH followed by draining followed by air-drying followed by exposure to air (100% RH at 25° C.) for 30 min. (10 l/min) | 6.85 g. of H₂O & residual S & residual NaOH | 130 min. | 14.4 wt-% |
| 10 | Same procedure as cycle 9 | " | 135 min. | 14.9 wt-% |

*bv = bed volume.

EXAMPLE 2

The procedures of Example 1 above were repeated, but employing NaOH at 4.8% by weight concentration. In addition, the dry, virgin activated carbon sample was used to remove H₂S without prior exposure to moisture; and a loaded sample regenerated/impregnated in accordance with this invention was used to remove H₂S from a gas stream containing no oxygen. The details of the various regeneration/impregnation procedures and the results thereof, as well as of the additional samples described, are set out in the following table of data.

TABLE II

| Cycle No. | Carbon Pretreatment | Weight Pickup | Break-Through Time | % H₂S Loading |
|---|---|---|---|---|
| 1-A | Virgin carbon exposed to air (100% RH at 25° C.) for 4 hrs. (10 l/min) | 2.60 g. of H₂O | 85 min. | 9.4 wt-% |
| 2-A | 15-Hr. soak in one bv of 4.8 wt-% NaOH followed by water wash to reduce pH, followed by air-drying for 2 hrs. (10 l/min), followed by exposure to air (100% RH at 25° C.) for 2 hrs. (10 l/min) | 2.85 g. of H₂O & residual S | 152 min. | 16.8 wt-% |
| 3-A | Same procedure as cycle 2-A | 2.90 g. of H₂O & residual S | 145 min. | 16.0 wt-% |
| 4-A | 68-Hr. soak in one bv of 4.8 wt-% NaOH followed by water wash to reduce pH, followed by air-drying for 2 hrs. (10 l/min), followed by exposure to air (100% RH at 25° C.) for 2 hrs. (10 l/min) | 3.0 g. of H₂O & residual S | 155 min. | 17.2 wt-% |
| 5-A | 15-Hr. soak in one bv of 4.8 wt-% NaOH followed by draining followed by air-drying (90% RH at 25° C.) for 2 hrs. (10 l/min) | 3.75 g. of H₂O & residual S & residual NaOH | 208 min. | 23.0 wt-% |
| 6-A | 15-Hr. soak in one bv of 4.8 wt-% NaOH followed by draining followed by N₂ drying (90% RH at 25° C.) for 2 hrs. (10 l/min) | 3.6 g. of H₂O & residual S & residual NaOH | 40 min. (No O₂ in adsorbing gas stream) | 4.4 wt-% |
| 1-B | Virgin carbon | 0.0 g. | 18 min. | 2.0 wt-% |

TABLE II-continued

| Cycle No. | Carbon Pretreatment | Weight Pickup | Break-Through Time | % H$_2$S Loading |
|---|---|---|---|---|
| | | | (No O$_2$ in adsorbing gas stream) | |

The results of the above procedures whereby activated carbon is impregnated with NaOH and moisture and used to remove H$_2$S from a gas stream, when compared to the removal efficiency, that is, the breakthrough time or percent H$_2$S loading, of dry or moist virgin activated carbon not impregnated with NaOH, and of NaOH-impregnated activated carbon in the absence of moisture, make it clear that the combined presence of NaOH and moisture in the activated carbon results in a ten-fold increase in the H$_2$S removal efficiency of the activated carbon of the present invention.

EXAMPLE 3

Experiments were carried out to determine the effect of mesh size, column size and flow rate on the H$_2$S removal efficiency of NaOH and moisture impregnated activated carbon. BPL activated carbon of 4 × 10 and 12 × 30 mesh was employed which had been impregnated with 5% by weight of NaOH and then exposed to an 80% R.H. air stream to introduce moisture, in the amount of 18.75% by weight, into the carbon. Pure H$_2$S gas was diluted to 1.0% by volume with air that had been preconditioned with moisture to 80% R.H. Air flow rates were monitored by meter and the concentration of H$_2$S adjusted to 1.0% by comparison with a calibration standard. Breakthrough to 1 ppm of H$_2$S was determined using detector tubes sensitive in the 1–50 ppm range, available from Mine Safety Appliances Company, Pittsburgh, Pennsylvania. Two columns, 2.3 and 0.74 inches in diameter, were used, and flow rates of 10 and 100 linear feet per minute were maintained. The results of the investigation, showing the effect of flow rate, are illustrated in the following table of values.

TABLE III

| Experiment No. | Column Diameter (in.) | Mesh Size | Flow Rate (ft/min.) | Breakthrough Time (hr.) | Weight Percent H$_2$S Loading to Breakthrough |
|---|---|---|---|---|---|
| 1 | 2.3 | 4 × 10 | 100 | 7.5 × 10$^{-2}$ | 2.80 |
| 2 | " | 12 × 30 | 10 | 7.97 | 30.1 |
| 3 | 0.74 | 12 × 30 | 100 | 3.4 × 10$^{-1}$ | 12.7 |
| 4 | " | 4 × 10 | 10 | 7.1 | 24.8 |

The values obtained show that flow rate, but not mesh size or column diameter, is an important parameter to be considered in designing adsorption systems in accordance with the present invention.

EXAMPLE 4

Samples of virgin BPL activated carbon, BPL impregnated with 5% by weight NaOH and 8.3% by weight moisture, and BPL regenerated and impregnated with 5% by weight NaOH and 8.3% by weight moisture, all 4 × 10 mesh, were used to determine their respective adsorptive capacities for methyl mercaptan. The testing was carried out in a continuous flow system in which the column consisted of a 19 mm diameter glass column. The sample charge was 10 cc which resulted in a bed height of 72 mm. The weight of the sample charge was 4.6 g. for the virgin BPL and 5.4 g. for the 5% NaOH impregnated BPL contained 8.3% moisture. A gas mixture containing 1.3% methyl mercaptan, 10% oxygen and the balance nitrogen was passed downstream through the bed at a space velocity of 3000 bed volumes per hour. The methyl mercaptan content of the inlet and outlet gas stream was analyzed by gas chromatography. All tests were run at ambient temperature and pressure. The regenerated and impregnated sample was obtained from NaOH impregnated BPL activated carbon (5% by weight) that had been previously loaded to 10% of influent (0.13% by volume) breakthrough during methyl mercaptan adsorption. The loaded carbon was regenerated with 2 bed volumes of 5% NaOH solution, drained, and then air dried at room temperature until essentially the original weight of impregnated carbon was obtained. The results of the evaluation are illustrated in the table of values below.

TABLE IV

| Methyl Mercaptan Breakthrough % of Influent | Methyl Mercaptan Adsorption: % by Wt. | | |
|---|---|---|---|
| | Virgin BPL | NaOH Impregnated BPL | Regenerated and NaOH Impregnated BPL |
| 2% | 4.08 | 9.49 | 5.29 |
| 10% | 6.45 | 16.70 | 9.61 |

EXAMPLE 5

A preferred method of impregnating activated carbon with NaOH and moisture is by the spray-addition technique. In accordance with this method a 33% by weight aqueous solution of NaOH was sprayed onto 4 × 10 BPL activated carbon while it was being moved about in a Homart mixer. The amount of NaOH solution was chosen to provide 5% by weight of NaOH and 10% by weight of moisture in the final product. Four spray times ranging from 5.5 to 23 minutes were used in different treatments. However, subsequent performance evaluations failed to point up any distinction among the final products resulting from the differing spray times. No drying step was required.

EXAMPLE 6

A NaOH and moisture impregnated activated carbon prepared in accordance with the procedures described in Example 2 above, but so as to contain 5% NaOH and about 12% moisture in the impregnated activated carbon, was employed to remove H$_2$S from vacuum filter air at an operating sewage treatment plant. For purposes of comparison, a bed of virgin BPL activated carbon was employed in the same manner. The activated carbon beds were 4 inches in diameter and 6 inches in depth. The adsorber system was attached to a slip stream on the vacuum filter exhaust. Air from the exhaust was routed through a water knockout pot and a blower prior to being split into individual streams. The flow rate for the influent gas, i.e., the vacuum filter air, was maintained at 8 cubic feet per minute for each bed. The influent gas was passed downflow through the activated carbon beds and exhausted through 1-inch ball valves and rotometers. Influent gas was sampled by means of a valve installed upstream of the adsorbers. The influent and effluent concentrations of $H_2S$ were measured by means of Mine Safety Appliances Company $H_2S$ detector tubes sensitive in the 1–50 ppm range, and recorded. The results of these evaluations are illustrated in the table of values below.

TABLE V $H_2S$ Adsorption from Sewage Treatment Plant Vacuum Filter Air

| Elapsed Time (Hrs.) | $H_2S$ Inlet Concentration (p.p.m.) | $H_2S$ Effluent Concentration (p.p.m.) | |
|---|---|---|---|
| | | NaOH and Moisture Impregnated Activated Carbon | BPL Activated Carbon |
| 202.9 | 3 | 0 | 0 |
| 243.1 | 5 | 0 | 0 |
| 306.6 | 40 | 0 | 1 |
| 339.8 | 2 | 0 | 0 |
| 408.3 | 5 | 0 | 1 |
| 477.2 | 5 | 0 | 1 |
| 560.9 | 20 | 0 | 5 |
| 608.5 | 5 | 0 | 2 |
| 686.3 | 7 | 0 | 2 |
| 806.5 | 5 | 0 | Failed* |
| 1067.6 | 6 | 0 | |
| 1217.2 | 20 | 1 | |
| 1449.0 | 12 | 1 | |
| 1577.0 | 5 | 0 | |

*Bed ceased to function due to occlusion of activated carbon granules by microorganism deposits.

EXAMPLE 7

The removal efficiency of NaOH and moisture impregnated activated carbon for malodorant compositions generally was evaluated by means of a dynamic olfactometer as previously described. The impregnated activated carbon was prepared as described above in Example 2, but so as to contain 5% NaOH and about 12% moisture in the impregnated activated carbon. For purposes of comparison, a bed of virgin BPL activated carbon was employed in the same manner. A model 1000 dynamic olfactometer from Chicago Scientific, Inc. was employed. Overall, the evaluation system was set up as described above in Example 6. The mean $H_2S$ level in the influent air was determined to be 5.8 ppm. This value, together with the laboratory odor threshold value for $H_2S$ permitted calculation of the $H_2S$ contribution to the total inlet odor. This contribution was determined to be 830 odor units (O.U.) in a gas stream having a mean odor level of 5500 O.U. Thus, other malodorous compositions made a significant contribution to the total odor level. Gas chromatographic analysis revealed the presence of at least 25 compounds in addition to $H_2S$ in the influent gas.

The odor panel was selected on the basis of screening with known odorants consisting of $CH_3NH_2$, $H_2S$, $CH_3SH$ and $(CH_3)_2S_2$, and mixtures thereof. The mean standard deviation and percent standard deviation/mean were determined and utilized in selection of members of the odor panel. At least three members of the odor panel were employed for any evaluation. Odor response data was analyzed by least squares linear regression analysis of the log of the odor level (expressed in odor units) versus a linearized expression of the normal probability function. Odor thresholds were determined from the linear regression curve by choosing the odor level at which 50% of the odor panel participants were able to detect the odor. The calculated odor levels emanating from each adsorber were compared to the influent odor levels and expressed as "% odor removal" on a day to day basis. Trend analysis was conducted by plotting the log "% odor removal" versus "time" and linear regression analysis was conducted on this data. Correlation coefficients in all instances indicated that the curve fitting procedure was a reliable representation of the data to the 99.9% confidence level.

The results of these evaluations are illustrated in the following table of values.

TABLE VI

| Elapsed Time (Hrs.) | Inlet Odor (O.U.) | Effluent Odor (O.U.)* | |
|---|---|---|---|
| | | NaOH and Moisture Impregnated Activated Carbon | BPL Activated Carbon |
| 94.1 | 2350 | 5.1 | 16.8 |
| 182.2 | 5151 | 25 | 34 |
| 325.1 | 5750 | 231 | 377 |
| 408.3 | 6050 | 130 | 235 |
| 528.8 | 2201 | 74 | 221 |
| 608.5 | 5401 | 271 | 1080 |
| 752.8 | 2261 | 229 | 453 |
| 875.2 | 1314 | 209 | ** |
| 944.7 | 2814 | 281 | |
| 1067.6 | >11,000 | 2676 | |
| 1217.2 | 2726 | 1363 | |
| 1341.0 | 5501 | 1101 | |
| 1449.4 | 1351 | 541 | |
| 1577.0 | 10,801 | 2161 | |

*O.U. = odor units.
**Bed ceased to function due to occlusion of activated carbon granules by microorganism deposits.

What we claim is:

1. A process for removal of $H_2S$ and methyl mercaptan from gas streams containing oxygen, comprising contacting said gas stream with an activated carbon having impregnated therein from about 0.5 to about 20 percent by weight of NaOH, and from about 4 to about 50 percent by weight of moisture, both based on weight of dry activated carbon.

2. The process of claim 1 wherein the activated carbon has impregnated therein from about 5 to about 10 percent by weight of NaOH, and from about 10 to about 40 percent by weight of moisture, both based on weight of dry activated carbon.

3. The process of claim 1 comprising the additional step of using NaOH to regenerate the activated carbon used to adsorb $H_2S$ and methyl mercaptan under conditions sufficient to also subsequently impregnate the activated carbon with NaOH and moisture in the amounts set forth in claim 1.

4. An activated carbon for removal of $H_2S$ and methyl mercaptan, characterized by having impregnated therein from about 0.5 to about 20 percent by weight of NaOH, and from about 4 to about 50 percent by weight of moisture, both based on weight of dry activated carbon.

5. The activated carbon of claim 4 characterized by having impregnated therein from about 5 to about 10 percent by weight of NaOH, and from about 10 to about 40 percent by weight of moisture, both based on weight of dry activated carbon.

* * * * *